United States Patent
Vaidhyanathan et al.

(10) Patent No.: US 10,448,801 B2
(45) Date of Patent: Oct. 22, 2019

(54) SELF-CLEANING FILTRATION SYSTEM FOR A DISHWASHER

(71) Applicant: Samsung Electronics Co., Ltd., Suwon-si (KR)

(72) Inventors: Raveendran Vaidhyanathan, Riverwoods, IL (US); Edward Thies, Creola, OH (US); Viktor Kopyrin, Grosse Pointe Shores, MI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 15/073,478

(22) Filed: Mar. 17, 2016

(65) Prior Publication Data

US 2017/0265712 A1 Sep. 21, 2017

(51) Int. Cl.
- *A47L 15/42* (2006.01)
- *B01D 29/03* (2006.01)
- *B01D 29/68* (2006.01)
- *B01D 29/90* (2006.01)

(52) U.S. Cl.
CPC ....... *A47L 15/4208* (2013.01); *A47L 15/4217* (2013.01); *A47L 15/4278* (2013.01); *B01D 29/03* (2013.01); *B01D 29/688* (2013.01); *B01D 29/904* (2013.01)

(58) Field of Classification Search
CPC ...... A47L 15/18; A47L 15/4208; A47L 15/14; A47L 15/16; A47L 15/20; A47L 15/22; A47L 15/23; B01D 29/68; B01D 29/688; B01D 29/904

See application file for complete search history.

(56) References Cited

U.S. PATENT DOCUMENTS

| | | | | |
|---|---|---|---|---|
| 2,236,791 A | * | 4/1941 | Forsberg | A47L 15/18 134/172 |
| 3,176,697 A | * | 4/1965 | Gibson | A47L 15/0089 134/183 |
| 3,177,095 A | * | 4/1965 | Gibson | A47L 15/0089 134/183 |
| 4,993,444 A | * | 2/1991 | Toriyama | A47L 15/18 134/181 |
| 5,165,435 A | | 11/1992 | Thies et al. | |
| 5,730,805 A | | 3/1998 | Bertsch et al. | |
| 5,803,106 A | | 9/1998 | Cohen et al. | |
| 5,909,743 A | | 6/1999 | Thies et al. | |
| 6,103,047 A | | 8/2000 | Ogawa | |
| 6,182,674 B1 | | 2/2001 | Jozwiak et al. | |

(Continued)

FOREIGN PATENT DOCUMENTS

EP 0150478 A1 * 8/1985 ......... A47L 15/4206

*Primary Examiner* — Marc Lorenzi

(57) ABSTRACT

A dishwasher filtration system includes a coarse filter disposed in a tub of a dishwasher, the coarse filter configured to filter water directed to a main wash pump. The system also includes a soil accumulation chamber configured to receive a portion of water from the main wash pump. The system further includes a fine filter covering an opening of the soil accumulation chamber, the fine filter configured to filter the portion of water received inside the soil accumulation chamber. The system also includes a backwash nozzle configured to supply water to the fine filter. In addition, the system may include a deflector that deflects the water from the backwash nozzle to the fine filter.

16 Claims, 11 Drawing Sheets

(56) References Cited

U.S. PATENT DOCUMENTS

| | | |
|---|---|---|
| 6,432,261 B2 | 8/2002 | Watanabe et al. |
| RE37,831 E | 9/2002 | Thies |
| 6,615,853 B2 | 9/2003 | Hegeman et al. |
| 6,832,617 B2 | 12/2004 | Hegeman et al. |
| 6,938,627 B2 | 9/2005 | Jung et al. |
| 7,556,050 B2 | 7/2009 | Lee |
| 7,946,304 B2 | 5/2011 | Kim et al. |
| 8,104,489 B2 | 1/2012 | Kim et al. |
| 8,449,690 B2 | 5/2013 | Jeong et al. |
| 8,603,255 B2 | 12/2013 | Classen et al. |
| 2002/0014260 A1* | 2/2002 | Kim ................ A47L 15/4206 134/104.1 |
| 2002/0074026 A1* | 6/2002 | Kim ................ A47L 15/4208 134/104.1 |
| 2003/0029781 A1* | 2/2003 | Hegeman .......... A47L 15/4202 210/167.01 |
| 2004/0173245 A1 | 9/2004 | Elick et al. |
| 2006/0042668 A1 | 3/2006 | Welch |
| 2006/0118144 A1 | 6/2006 | Woo |
| 2006/0174924 A1 | 8/2006 | Hedstrom et al. |
| 2008/0135067 A1* | 6/2008 | Mersch ............. A47L 15/4202 134/25.2 |
| 2012/0312337 A1 | 12/2012 | Boyer et al. |
| 2015/0000714 A1 | 1/2015 | Yoo et al. |
| 2015/0128999 A1 | 5/2015 | Park et al. |
| 2015/0129004 A1 | 5/2015 | Lee et al. |

* cited by examiner

SELF-CLEANING FILTRATION SYSTEM FOR A DISHWASHER

TECHNICAL FIELD

This disclosure relates generally to dishwasher appliances and more specifically to a self-cleaning filtration system for a dishwasher.

BACKGROUND

Dishwashers are used throughout the world to automate and reduce the effort associated with cleaning dishes. Many dishwashers, including most North American dishwashers, incorporate a "chopper" system that chops food particles so that they can be filtered through a sizing plate. Other dishwashers, including many European dishwashers, do not have a chopper system, but include multiple filters for filtering food particles of different sizes. Both types of dishwashers have various disadvantages.

SUMMARY

This disclosure provides a self-cleaning filtration system for a dishwasher.

In a first embodiment, a dishwasher filtration system is provided. The system includes a coarse filter disposed in a tub of a dishwasher, the coarse filter configured to filter water directed to a main wash pump. The system also includes a soil accumulation chamber configured to receive a portion of water from the main wash pump. The system further includes a fine filter covering an opening of the soil accumulation chamber, the fine filter configured to filter the portion of water received inside the soil accumulation chamber. The system also includes a backwash nozzle configured to supply water to the fine filter. In addition, the system may include a deflector that deflects the water from the backwash nozzle to the fine filter.

In a second embodiment, a dishwasher is provided. The dishwasher includes a tub and a main wash pump. The dishwasher also includes a coarse filter disposed in the tub, the coarse filter configured to filter water directed to the main wash pump. The dishwasher further includes a soil accumulation chamber configured to receive a portion of water from the main wash pump. The dishwasher also includes a fine filter covering an opening of the soil accumulation chamber, the fine filter configured to filter the portion of water received inside the soil accumulation chamber. The dishwasher further includes a backwash nozzle configured to supply water to the fine filter. In addition, the dishwasher may include a deflector that deflects the water from the backwash nozzle to the fine filter.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is foil led from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
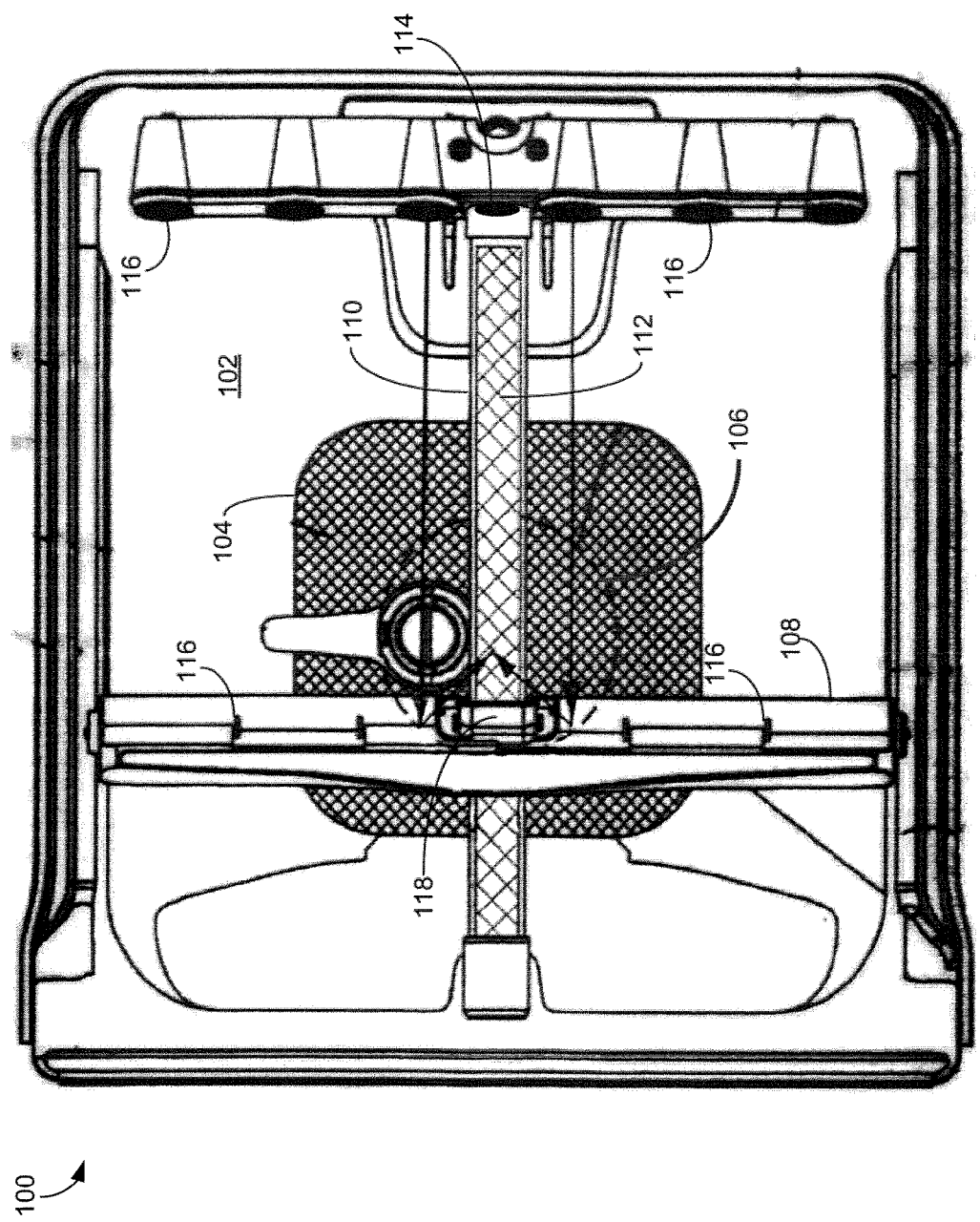
FIG. 1A illustrates a top view of the interior of an example dishwasher including a self-cleaning filtration system according to this disclosure.

FIGS. 1A through 5E, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Most dishwashers in North America and some other countries include a "chopper" system. This is usually a combination of a stainless steel sizing plate and a blade assembly. The sizing plate is generally flat and includes many small holes through which food and soil particles can be sized and filtered. In a typical dishwasher, the sizing plate is approximately two inches in diameter and approximately one thirty-second of an inch thick. The sizing plate and blade assembly control the size of food particles before they reach the wash arms or other spray nozzles that deliver water to the soiled dishes. The holes in the sizing plate have a diameter selected to be smaller than the diameter or size of any wash arm or spray nozzle so that particles passing through the holes in the sizing plate will also be able to pass through the larger holes in the wash arms or nozzles.

The chopping system has a disadvantage in that chopping food particles to reduce their size creates many more particles, most of which are pumped through the wash arm nozzles and back over the dishware to be cleaned. The increased number and smaller size of the chopped particles makes the particles harder to collect and filter out. Additionally, the chopper system is generally noisy, requires a larger sump space, and is less energy efficient.

Alternatively, traditional European style dishwashers are quieter and more energy efficient, compared to the chopper system. The European washers typically have a large rough screen filter that separates the filtered fluid to the main pump suction input and the filtrate to a soil collection area. The filtered fluid contains particle sizes small enough to not clog the water distribution system. The filtered fluid is recirculated by the main wash pump. Part of the filtrate from the rough screen filter passes through a secondary fine screen filter and is fed into the main pump suction input, while the filtrated soils are directed to the soil collection area. Typically, the fine screen filter is submerged in the sump and must be manually cleaned by the dishwasher user, sometimes as often as every wash cycle. While the European system allows smaller sump volumes and produces less noise due to the absence of chopper system, the required manual cleaning of the fine filter is a significant inconvenience to the user. Also, micro-filter clogging has been a common issue in such systems, and dilution techniques to remove small soil particles from the dishwasher typically result in more water and energy use for cleaning effectiveness.

While various types of self-cleaning filtration systems have been attempted in some chopper style dishwashers, these systems are designed for rotatory type water spray systems.

To address these and other issues, embodiments of this disclosure provide a dishwasher system that eliminates the disadvantages of the North American and European style dishwashers while including the benefits of both types. The disclosed embodiments feature a two stage filtration system that includes a large area coarse filter and a smaller fine filter. The coarse filter is a rough screen filter that separates the filtered fluid to the main pump suction input and the filtrate to the soil collection area. The filtered fluid contains particles sizes so as not to clog the water distribution system and is recirculated by the main wash pump. A small percentage of the filtered fluid is directed to a containment area, where it is filtered using the fine filter. The fine filter is cleaned automatically using one or more backwash nozzles from the distribution system and does not require manual cleaning.

Figure 1B:
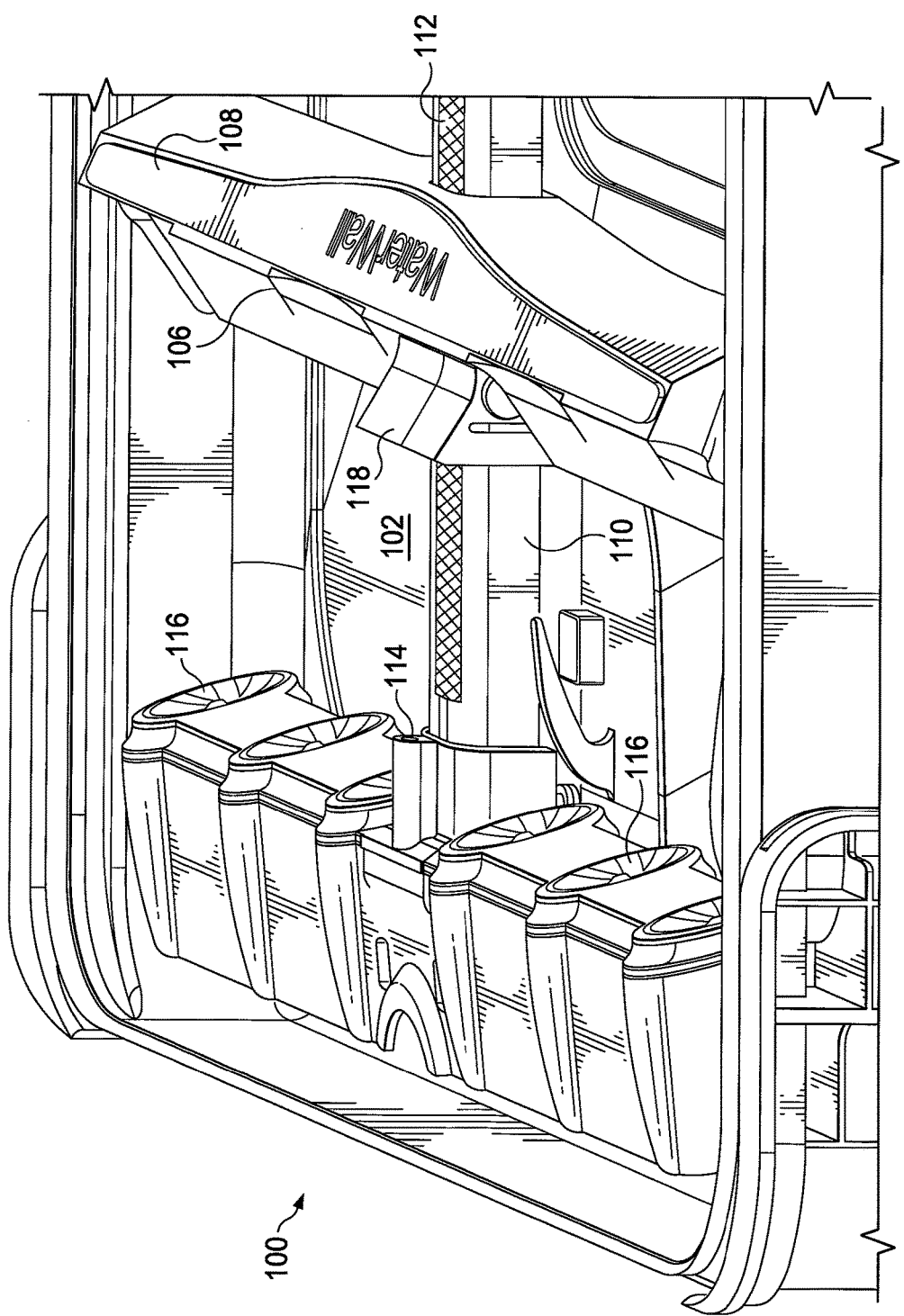
FIG. 1B illustrates a perspective view of portions of the dishwasher interior of FIG. 1A according to this disclosure.
Figure 2:
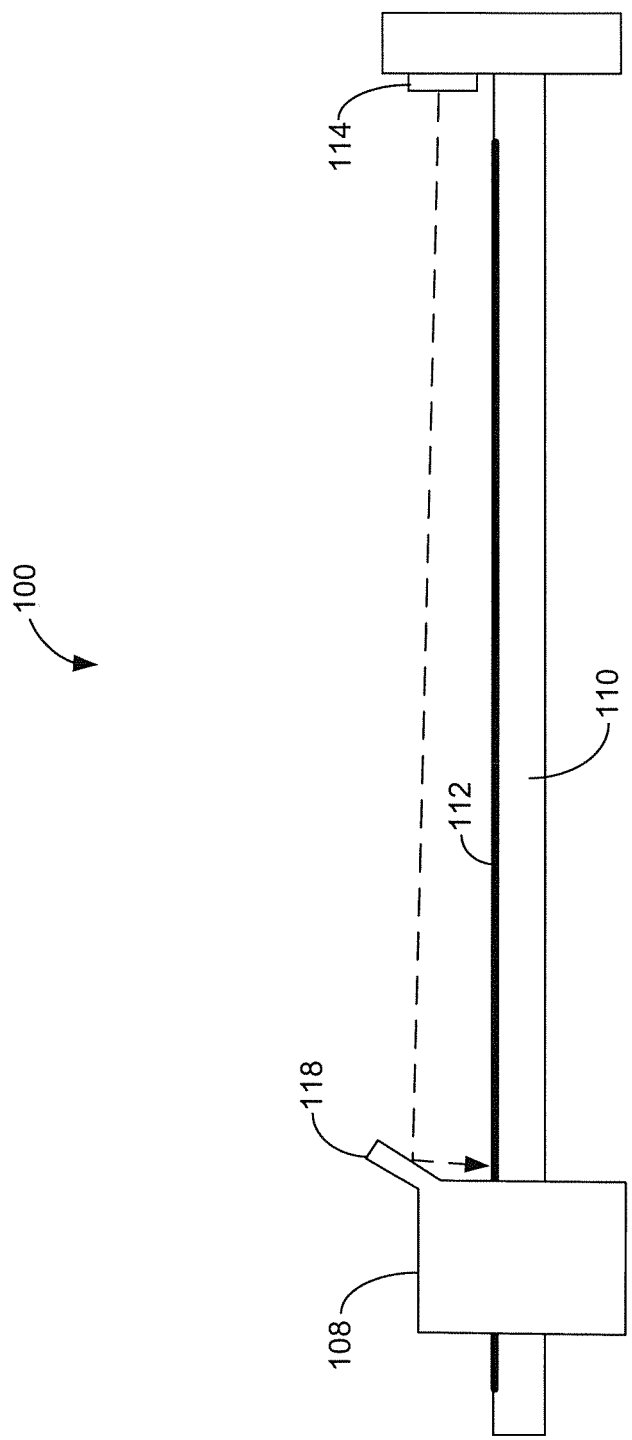
FIG. 2 illustrates a block diagram showing a side view of portions of the dishwasher interior of FIG. 1A according to this disclosure.

FIG. 1A illustrates a top view of the interior of an example dishwasher 100 including a self-cleaning filtration system according to this disclosure. FIG. 1B illustrates a perspective view of interior portions the dishwasher 100. FIG. 2 illustrates a block diagram showing a side view of interior portions of the dishwasher 100. Those skilled in the art will recognize that, for simplicity and clarity, some features and components are not explicitly shown, including those illustrated in connection with later figures. Such features, including those illustrated in later figures, will be understood to be equally applicable to the dishwasher 100. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIGS. 1A and 1B, the dishwasher 100 includes a tub 102, a coarse filter 104, a sump 106, a washer arm 108, a rail 110, a fine filter 112, a backwash nozzle 114, a plurality of spray nozzles 116, and a deflector 118.

The tub 102 has a bottom surface that generally slopes down toward a central portion of the tub 102, thereby allowing water to collect in the central portion. The coarse filter 104 is disposed in the bottom surface of the tub 102, generally in the central portion, although not necessarily in the exact center of the tub 102. Positioned underneath the coarse filter 104, and generally coinciding with the lowest level of the bottom surface to the tub 102, is the sump 106. During a wash cycle, water sprayed into the tub 102 falls through the coarse filter 104 into the sump 106, where it is input into a main pump (not shown) for recirculating. During a drain cycle, the water in the sump 106 is emptied into a drain (not shown) coupled to the sump 106.

The coarse filter 104 is a large area, generally planar, rough screen filter. In some embodiments, the course filter 104 may be roughly square or rectangular and approximately eight inches across, although it could be larger or smaller depending on the configuration of the dishwasher 100. During a wash cycle, water sprayed in the tub 102 falls to the bottom surface of the tub 102 and passes through the coarse filter 104. The course filter 104 has openings that trap larger soil particles but allow filtered water to flow down into the sump 106. The filtered water is recirculated by the main wash pump back to the spray nozzles 116. The filtered water contains soil particle sizes small enough to not clog the water distribution system. The larger soil particles trapped by the coarse filter 104 are filtrated to a soil collection area. The use of the coarse filter 104 allows the dishwasher 100 to operate successfully without the need for a chopper system.

The washer arm 108 extends substantially from one side of the tub 102 to the other side and includes a plurality of the spray nozzles 116 disposed along the length of the washer arm 108. The washer arm 108 is mounted for movement along the rail 110. During a wash cycle, the washer arm 108 move repeatedly along the rail 110 from the back portion of the tub 102 to the front portion of the tub 102, and back again. While the washer arm 108 moves, water from the various spray nozzles 116 spray into the tub 102 in different directions to clean the dish load, as known in the art.

As shown in the side view block diagram of FIG. 2, the washer arm 108 includes a deflector 118 that receives water sprayed from the backwash nozzle 114 and deflects the water downward to the exposed surface (hereinafter referred to as the front surface) of the screen of the fine filter 112, as described in greater detail below. The fine filter 112 is a fine screen filter with openings that are smaller than those of the coarse filter 104. As shown in FIGS. 1A and 1B, the horizontal position of the deflector 118 is approximately in the center of the washer arm 108, over the rail 110 and the fine filter 112. However, this is merely one example. The deflector 118 is generally positioned above the fine filter 112, so the location of the deflector 118 on the washer arm 108 generally depends on the location of the fine filter 112. In some embodiments, the deflector 118 can also deflect water from one or more spray nozzles 116 to the dish load for cleaning. In such embodiments, the deflector 118 may be wider than depicted in FIGS. 1A and 1B.

The rail 110 is a substantially linear rail mounted horizontally and elevated above the bottom surface of the tub 102. The rail 110 includes one or more guide rails, channels, or other constructs to guide the movement of the washer arm 108 back and forth along the rail 110.

Figure 3A:
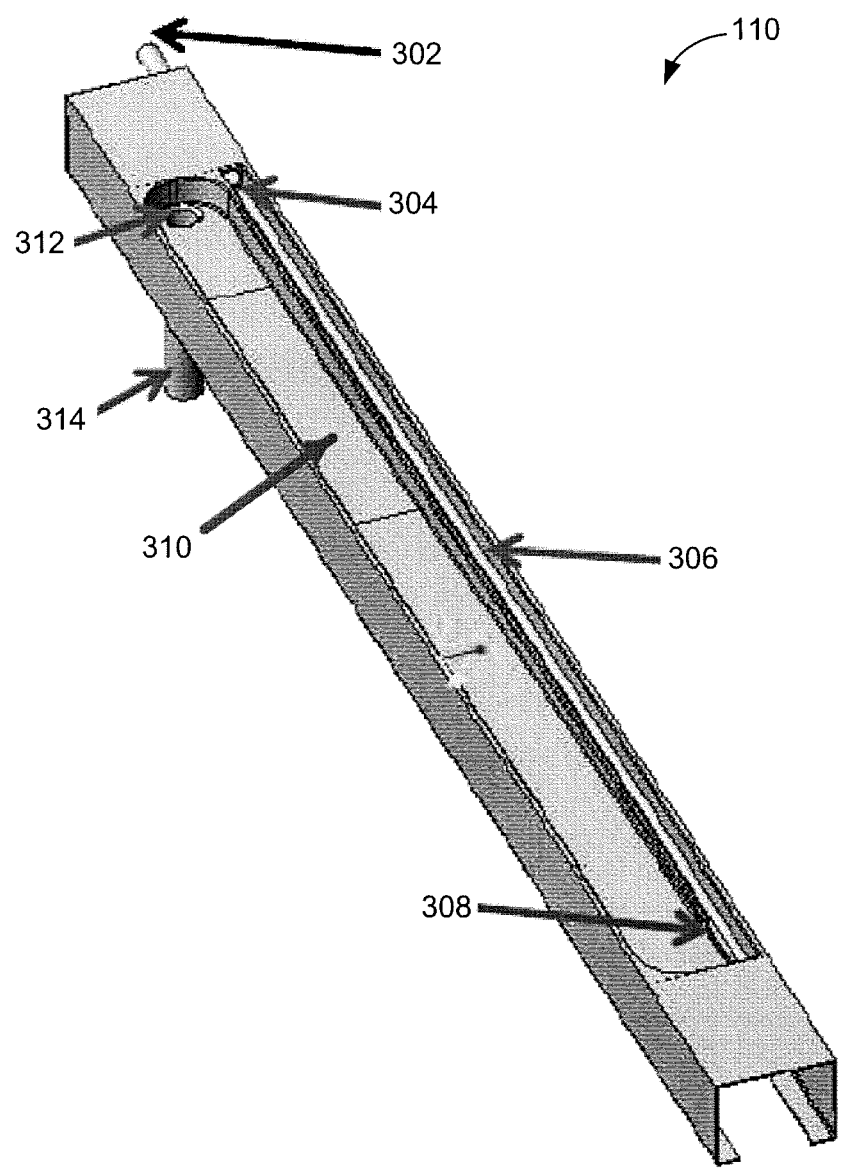
FIGS. 3A and 3B illustrate multiple embodiments of a rail shown in FIG. 1A, according to this disclosure.
Figure 3B:
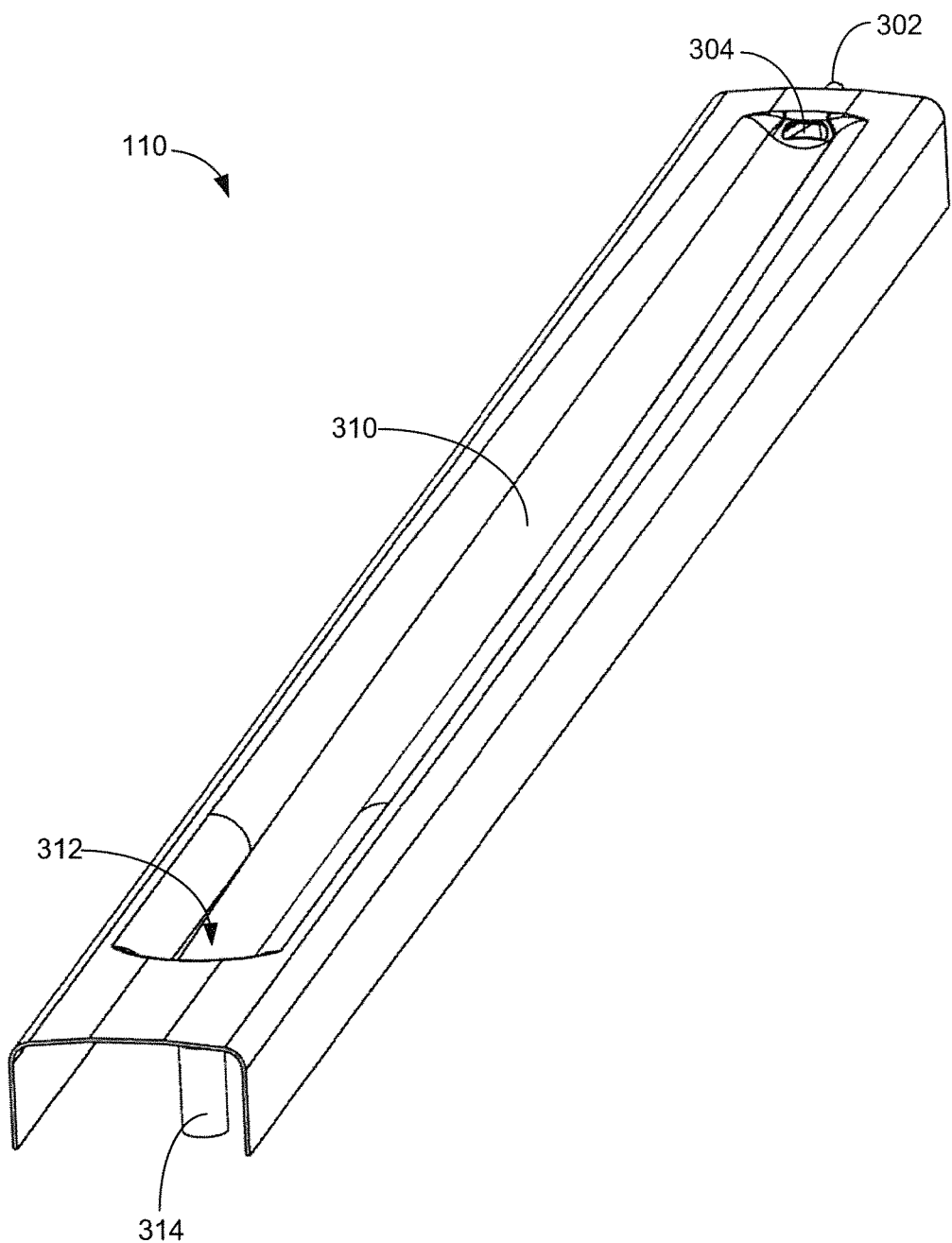

FIGS. 3A and 3B illustrate additional details of embodiments of the rail 110 according to this disclosure. In FIGS. 3A and 3B, the fine filter 112 has been removed from the top of the rail 110 in order to show the underlying components. As shown in FIG. 3A, the rail 110 includes a feeding pipe 302, a feeding opening 304, a feeding water channel 306, an input 308, a soil accumulation chamber 310, a drain entrance 312, and a drain pipe 314. A portion of water from the main pump that has been filtered by the coarse filter 104 enters the rail 110 through the feeding pipe 302, and passes through the feeding opening 304 and along the feeding water channel 306. The water then passes through the input 308 into the soil accumulation chamber 310. FIG. 3B shows a more simplified version of the rail 110 that eliminates the separate feeding water channel 306 and input 308. In FIG. 3B, water passes through the feeding opening 304 directly into the soil accumulation chamber 310.

On top of the soil accumulation chamber 310 is the fine filter 112. Once the soil accumulation chamber 310 is filled, the continuous supply of water into the soil accumulation chamber 310 causes the water to pass upward from the back side of the fine filter 112 (i.e., the back surface of the screen of the fine filter 112) through the fine filter openings in the screen and out the top side of the fine filter 112 (i.e., the front surface of the screen). The water then cascades off of the rail 110 and eventually back into the sump 106.

Fine particles trapped by the fine filter 112 remain in the soil accumulation chamber 310. These particles inside the soil accumulation chamber 310 have a tendency to clog the screen openings on the back side of the fine filter 112. To minimize clogging, the backwash nozzle 114 sprays water generally in the direction of the deflector 118, which is moving back and forth with the washer arm 108. The sprayed water hits the deflector 118 and is deflected downward through the screen openings of the fine filter 112, as indicated by the dashed line in FIG. 2. Because the spray is generally concentrated in a narrow pattern, the deflected water contacts the fine filter 112 in a fairly localized pattern below the deflector 118. The water dislodges (at least temporarily) any particles that may clog the fine filter 112 at that point. As the washer arm 108 and the deflector 118 move along the rail 110 and the fine filter 112, other portions of the fine filter 112 are sprayed. Together, the backwash nozzle 114 and the deflector 118 provide continuous cleaning of the fine filter 112 as the washer arm 108 moves back and forth inside the tub 102. This allows continued filtration through the fine filter 112, with little or no clogging.

The soil accumulation chamber 310 can be drained through the drain pipe 314 to remove excess particles. This can be performed during the drain cycle of the dishwasher or during a cleaning cycle of the soil accumulation chamber 310. In some embodiments, the floor of the soil accumulation chamber 310 slopes slightly downward toward the drain entrance 312. The slope encourages the soiled water inside the soil accumulation chamber 310 to move toward the drain entrance 312. While the soil accumulation chamber 310 is being drained, the backwash nozzle 114 can spray water to loosen particles stuck to the screen of the fine filter 112, so that the particles can be drained. This may be useful in situations where the screen becomes so clogged that water flow through the screen is reduced. In some embodiments, a pressure sensor or flow sensor may detect an increase in pressure inside the soil collection chamber 310 or decreased water flow through the fine filter 112 or the soil accumulation chamber 310, and the draining of the soil accumulation chamber 310 may be initiated automatically when the detected water flow decreases below a predetermined threshold. In some embodiments, a dedicated drain valve associated with the soil accumulation chamber 310 allows the soil accumulation chamber 310 to be drained without draining the entire tub 102. This reduces the amount of water that is drained, thereby saving resources.

Figure 4:
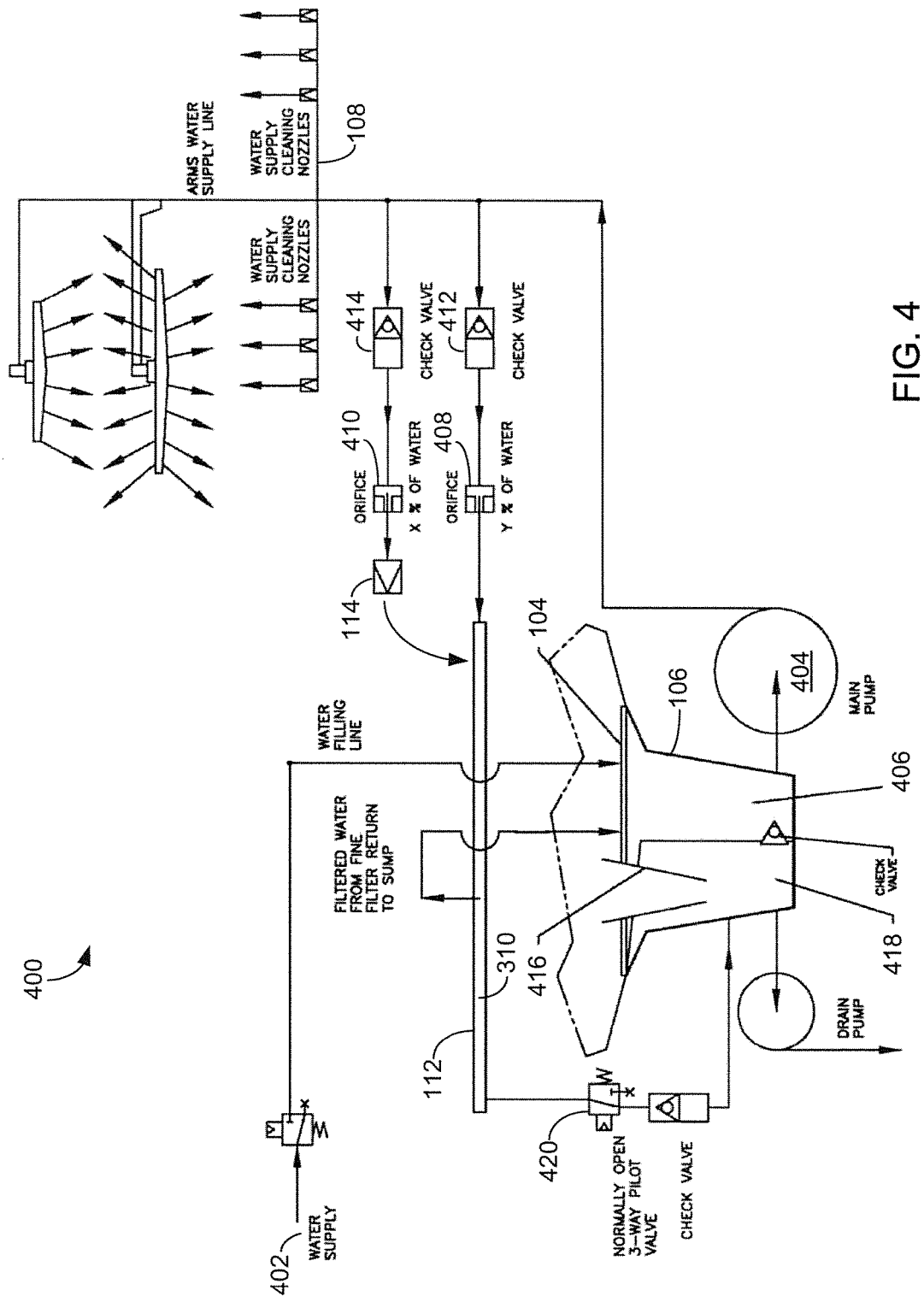
FIG. 4 illustrates an example hydraulic layout of the dishwasher of FIG. 1A according to this disclosure.

FIG. 4 illustrates an example hydraulic layout 400 of the dishwasher 100 according to this disclosure. The embodiment of the hydraulic layout 400 shown in FIG. 4 is for illustration only. Other embodiments of the hydraulic layout 400 can be used without departing from the scope of this disclosure.

In addition to the components shown in FIGS. 1A through 3B, the dishwasher 100 includes a water supply 402, a main pump 404, a main pump water collection area 406, multiple orifices 408-410, multiple check valves 412-414, a funnel 416, and a soil collection area 418.

During the wash cycle, liquid and particulates passing through the coarse filter 104 (which can be from recirculated wash water, the water supply 402, etc.) can be collected in the main pump water collection area 406 and directed to the main pump 404. The main pump 404 directs water to multiple areas according to operation of the check valves 412-414. A majority of the water (e.g., approximately 80%) is directed to the main water supply line and is used to clean the dish load. A small portion of the water (e.g., <20%) is directed to the orifice 408 leading to the soil accumulation chamber 310. Depending on the embodiment, the percentage of water is controllable by the check valve 412, the orifice 408, or both. The water enters the soil accumulation chamber 310 and then passes upward through the fine filter 112 to remove additional particulates prior to re-entering the tub 102, as described earlier.

Another portion of the water (e.g., <10%) is directed to the orifice 410 leading to the backwash nozzle 114. Depending on the embodiment, the percentage of water is controllable by the check valve 414, the orifice 410, or both. The backwash nozzle 114 sprays water that is directed to the fine filter 112. The sprayed water from the backwash nozzle 114 hits the fine filter 112 (via the deflector 118) to dislodge any particulates in the soil accumulation chamber 310 that are trapped by the fine filter 112. Additionally or alternatively, the main water supply line may include a nozzle from the tub interior directed to the fine filter 112 to clean the filter 112. Thus, the fine filter 112 is cleaned automatically and does not require manual cleaning.

In some embodiments, cleaning of the fine filter 112 is concurrent with operation of the washer arm 108. That is, whenever the washer arm 108 sprays water in a cleaning mode, the backwash nozzle 114 also sprays water to clean the fine filter 112. In some embodiments, the cleaning of the fine filter 112 may occur at least partially independently of operation of the washer arm 108. For example, cleaning of the fine filter 112 may also occur during a drain cycle when the washer arm 108 is not actively spraying. Programmable control of the check valves 412-414 determine when the cleaning of fine filter 112 occurs.

In some embodiments, the sump 106 may include the funnel 416. The funnel 416 may direct to a soil collection area 418 to collect particulates that are unable to pass through the coarse filter 104. In some embodiments, the dishwasher 100 may include a valve 420, such as a three-way pilot valve, that can be used for draining the soil collection chamber 310 separately.

As shown in FIG. 4, the embodiments described herein can also be applied to dishwashers with rotational arm spraying systems.

FIGS. 5A through 5E illustrate top views of example dishwasher interiors according to other embodiments of this disclosure. The dishwashers shown in FIGS. 5A through 5E include many of the same components as the dishwasher 100 of FIG. 1A; for the purposes of simplicity and clarity of the various embodiments, a detailed description of those elements are not repeated here.

Figure 5A:
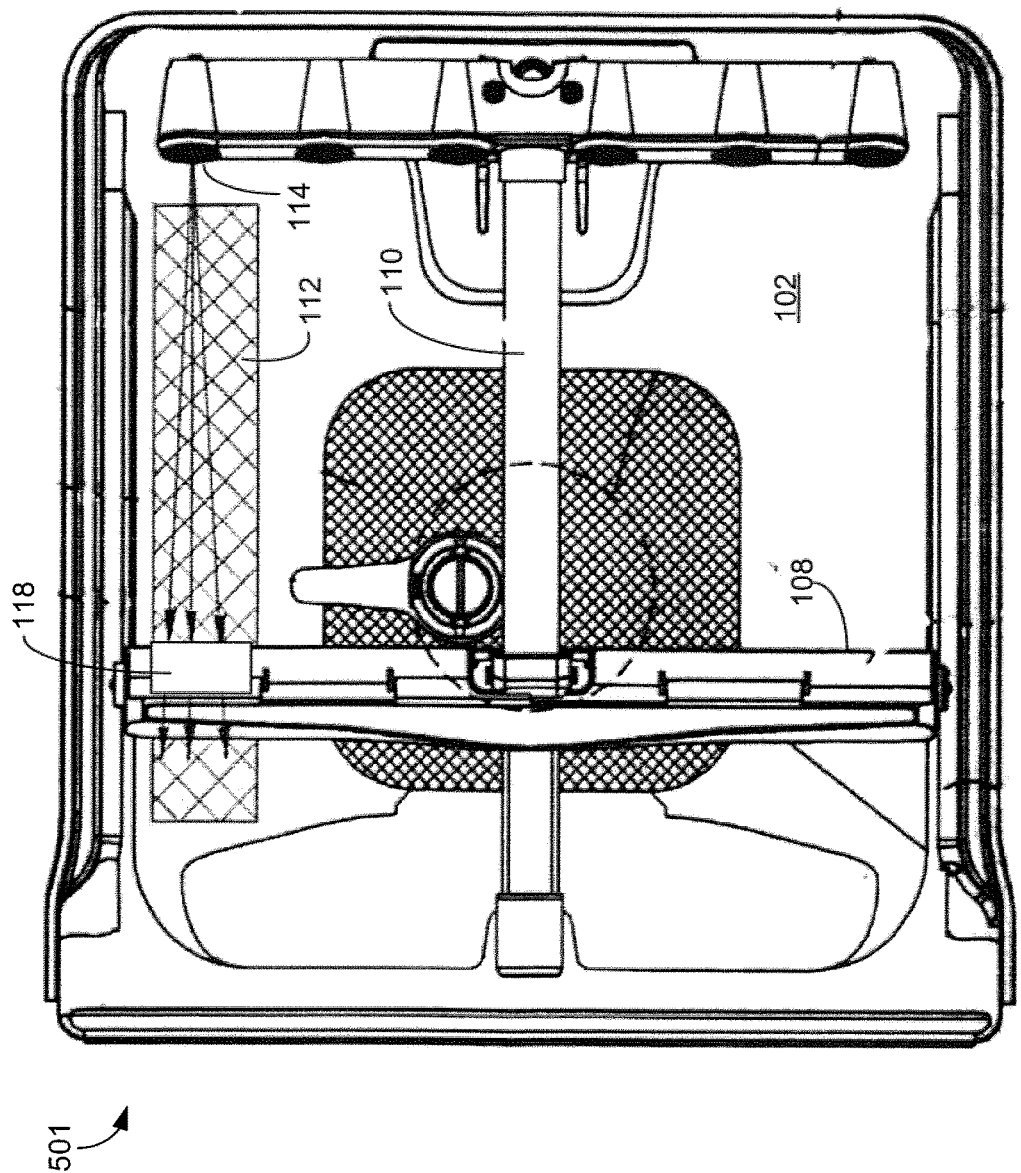
FIGS. 5A through 5E illustrate top views of example dishwasher interiors according to other embodiments of this disclosure.

In FIG. 5A, the dishwasher 501 includes the fine filter 112 disposed on the bottom surface of the tub 102 and near one sidewall of the dishwasher 501. Under the fine filter 112 are a soil accumulation chamber and other components that are the same as, or similar to, the components shown in FIGS. 3A and 3B. In the dishwasher 501, the backwash nozzle 114 is substantially aligned with a center line of the fine filter 112. Similarly, the deflector 118 is positioned near one end of the washer arm 108 so as to be substantially aligned with the fine filter 112. The deflector 118 receives the water sprayed from the backwash nozzle 114 and deflects the water to the fine filter 112, as described above.

Figure 5B:
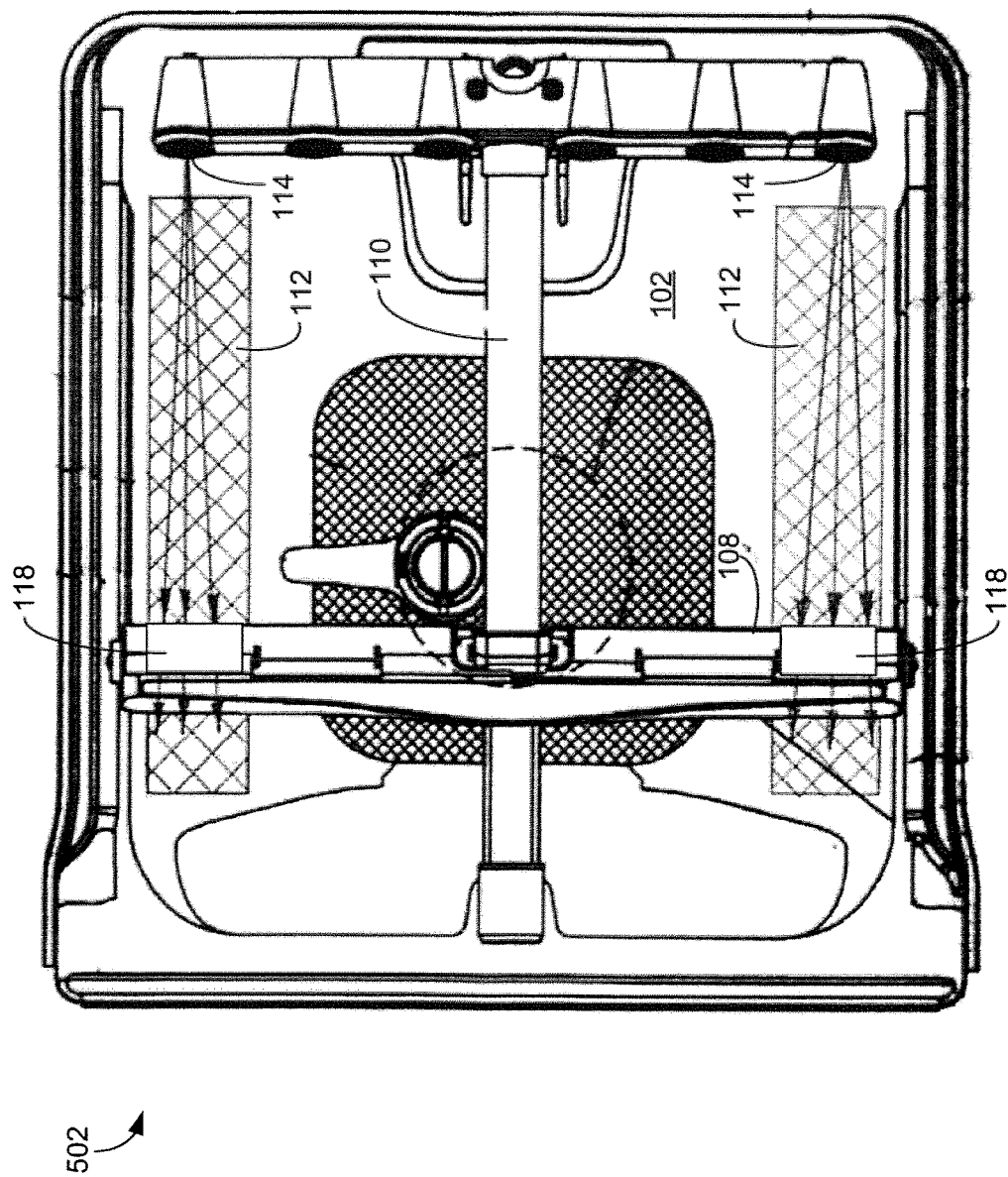

In FIG. 5B, the dishwasher 502 includes a first fine filter 112 at a location similar to the fine filter 112 in FIG. 5A. The dishwasher 502 also includes a second fine filter 112 at a location at the bottom surface of the tub 102 opposite the first fine filter 112. Thus, the dishwasher 502 features two fine filters 502 for additional filtering capability. Each of the fine filters 112 in FIG. 5B can be substantially the same as the fine filter 112 of FIG. 5A, and include corresponding components, including a soil accumulation chamber and the like. The dishwasher 502 also includes two backwash nozzles 114 and two deflectors 118, where each backwash nozzle 114 and deflector 118 is aligned with one of the fine filters 112.

Figure 5C:
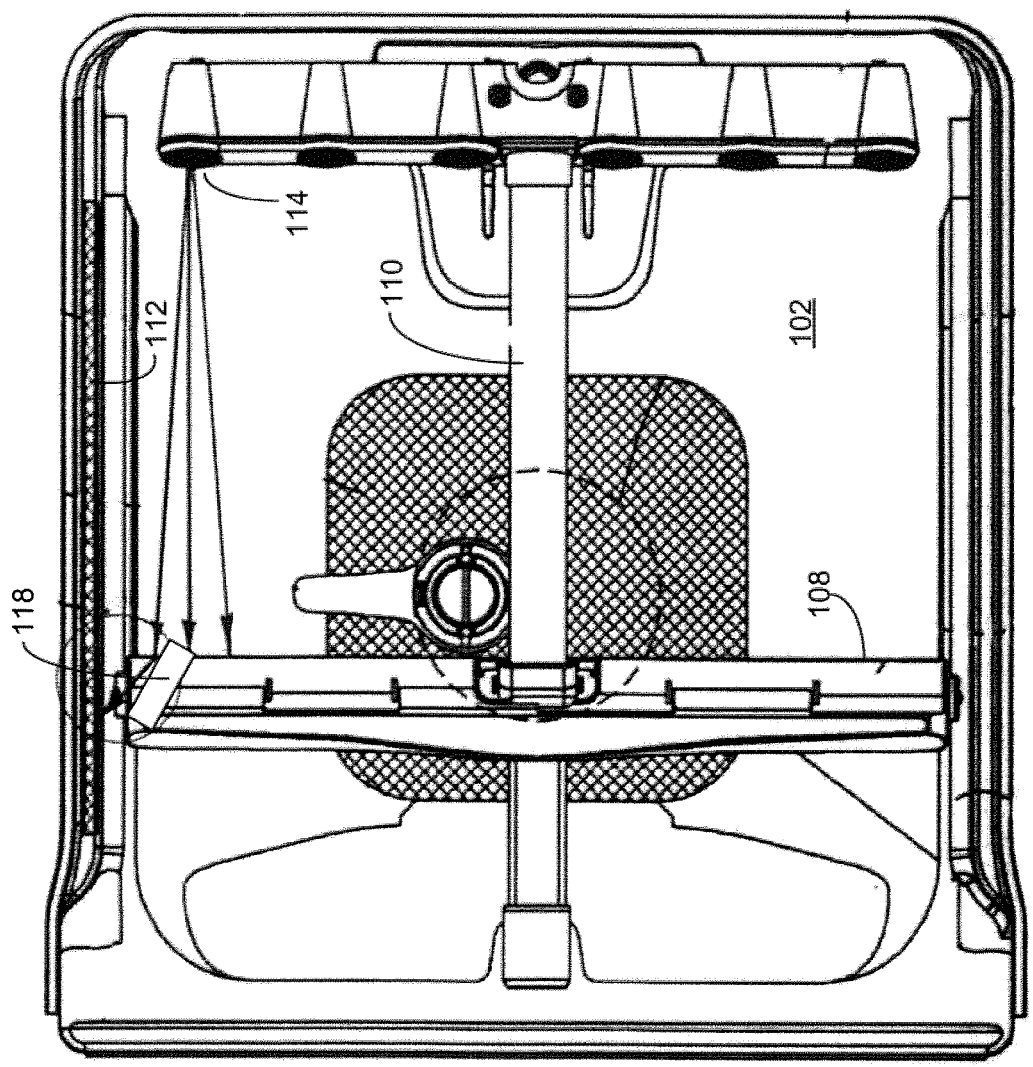
Figure 5D:
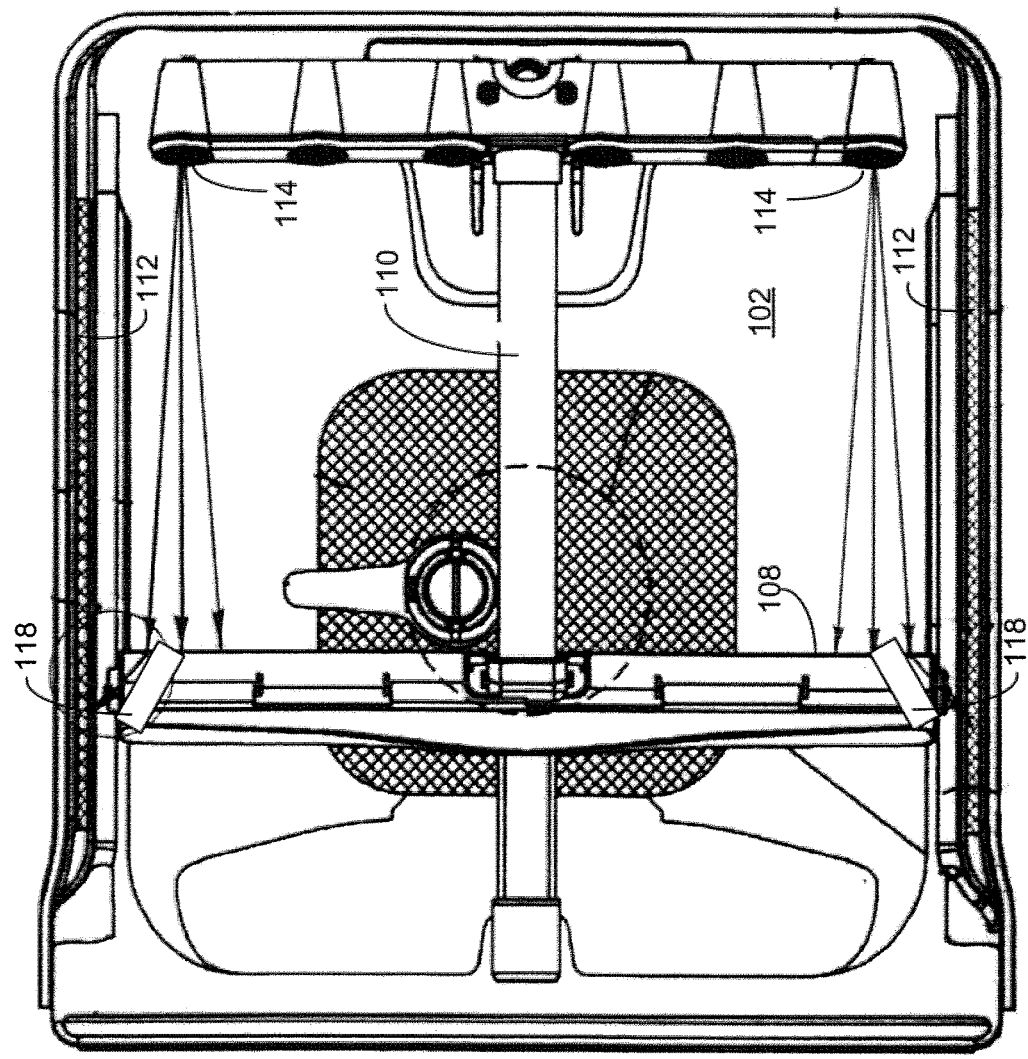

In FIG. 5C, the dishwasher 503 includes the fine filter 112 disposed in a sidewall of the tub 102. Behind the fine filter 112 are a soil accumulation chamber and other components that are the same as, or similar to, the components shown in FIGS. 3A and 3B. In the dishwasher 503, the deflector 118 is positioned near one end of the washer arm 108 and disposed at an angle to deflect water from the backwash nozzle 114 to the side toward the fine filter 112, as shown in FIG. 5C. In FIG. 5D, the dishwasher 504 includes two fine filters 112 disposed in opposite sidewalls of the tub 102. The dishwasher 504 also includes two backwash nozzles 114 and two deflectors 118, where each backwash nozzle 114 and deflector 118 is associated with one of the fine filters 112.

Figure 5E:
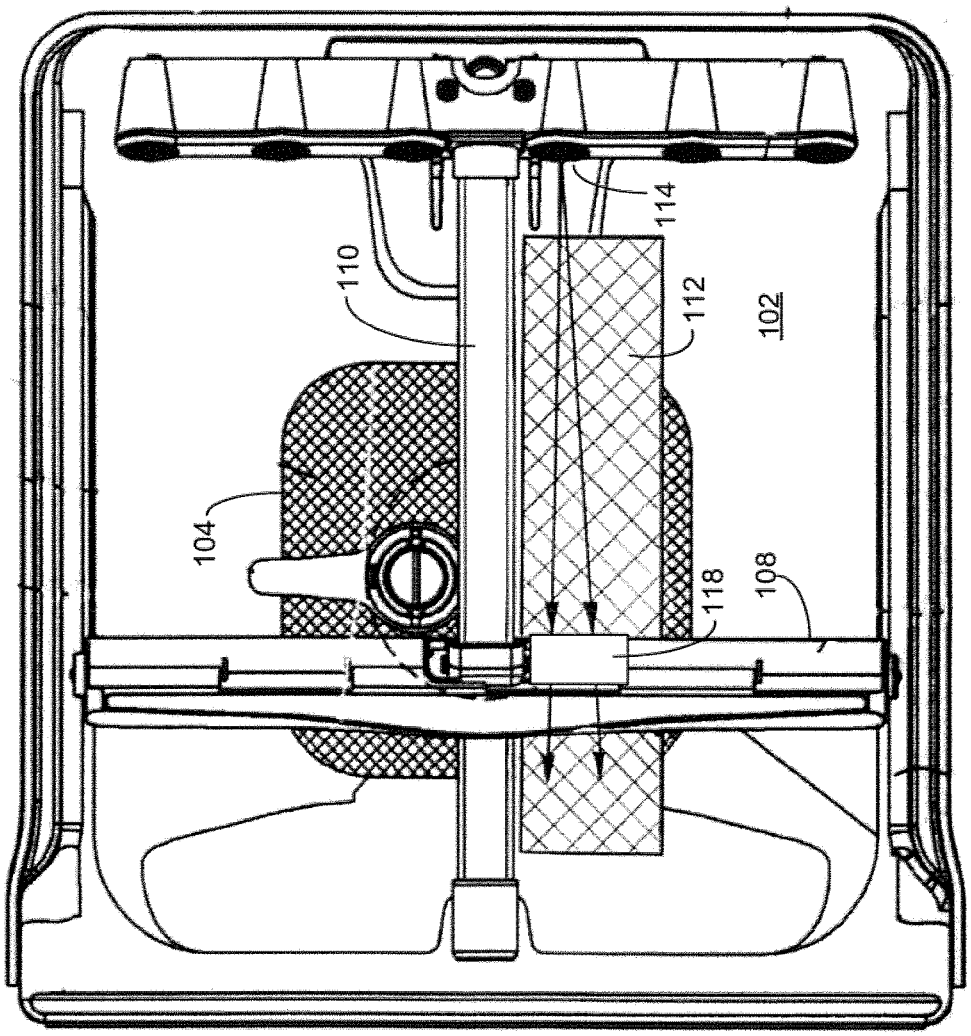

In FIG. 5E, the dishwasher 505 includes the fine filter 112 disposed over the coarse filter 104, near the centerline of the tub 102, but not on the rail of the washer arm 108. Under the fine filter 112 (but above the coarse filter 104) are a soil accumulation chamber and other components that are the same as, or similar to, the components shown in FIGS. 3A and 3B. In the dishwasher 505, the deflector 118 and the backwash nozzle 114 are substantially aligned with the fine filter 112.

In FIGS. 5A through 5E, since the fine filter 112 and corresponding components (e.g., soil accumulation chamber, and the like) are not coincident with the rail 110, the rail 110 can be formed more simply. For example, the rail 110 may include only components associated with guiding the movement of the washer arm 108.

Although FIGS. 1A through 5E illustrate different examples of a dishwasher, various changes may be made to the figures. For example, the dishwashers shown can include any number of each component in any suitable arrangement. In general, dishwashers come in a wide variety of configurations, and FIGS. 1A through 5E do not limit the scope of this disclosure to any particular configuration(s). Moreover, while FIGS. 1A through 5E illustrate operational environments in which various filtration and cleaning features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A dishwasher filtration system comprising:
   a coarse filter disposed in a tub of a dishwasher, the coarse filter configured to filter water directed to a main wash pump;
   a soil accumulation chamber configured to receive a portion of water from the main wash pump;
   a fine filter covering an opening of the soil accumulation chamber, the fine filter configured to filter the portion of water received inside the soil accumulation chamber;
   a washing arm configured to linearly traverse between a back of the tub and a front of the tub;

a backwash nozzle configured to supply water towards the washing arm to provide continuous cleaning of the fine filter;

a wash nozzle configured to supply water towards the washing arm from a same direction as the backwash nozzle; and a deflector mounted on the washing arm and configured to deflect the water from the backwash nozzle in an opposite direction from a deflection of water from the wash nozzle.

2. The system of claim 1, wherein the deflector is configured to deflect the water supplied horizontally from the backwash nozzle downward to the fine filter.

3. The system of claim 2, wherein the washing arm is configured to traverse laterally back and forth across a majority of the tub.

4. The system of claim 3, wherein the fine filter is cleaned using water from the backwash nozzle in a linear operation that coincides with the lateral traversal of the washing arm.

5. The system of claim 4, wherein the water from the backwash nozzle sprays a front surface of the fine filter and passes through the fine filter, thereby dislodging particles lodged on a back surface of the fine filter.

6. The system of claim 1, wherein the fine filter and the soil accumulation chamber comprise part of a rail that is configured to guide lateral traversal of the washing arm.

7. The system of claim 1, wherein the fine filter and the soil accumulation chamber are disposed in a bottom surface of the tub of the dishwasher.

8. The system of claim 1, further comprising:
a first valve configured to control a percentage of water flow to the soil accumulation chamber; and
a second valve configured to control a percentage of water flow to the backwash nozzle.

9. The system of claim 1, wherein water flow out of the soil accumulation chamber is at least partially controlled by a drain valve configured to drain water from the soil accumulation chamber without draining water from the tub of the dishwasher.

10. A dishwasher comprising:
a tub;
a main wash pump;
a coarse filter disposed in the tub, the coarse filter configured to filter water directed to the main wash pump;
a soil accumulation chamber configured to receive a portion of water from the main wash pump;
a fine filter covering an opening of the soil accumulation chamber, the fine filter configured to filter the portion of water received inside the soil accumulation chamber;
a washing arm configured to linearly traverse between a back of the tub and a front of the tub;
a backwash nozzle configured to supply water towards the washing arm to provide continuous cleaning of the fine filter;
a wash nozzle configured to supply water towards the washing arm from a same direction as the backwash nozzle; and
a deflector mounted on the washing arm and configured to deflect water from the backwash nozzle in an opposite direction from a deflection of water from the wash nozzle.

11. The dishwasher of claim 10, wherein the deflector is configured to deflect the water supplied horizontally from the backwash nozzle downward to the fine filter.

12. The dishwasher of claim 11, wherein the washing arm is configured to traverse laterally back and forth across a majority of the tub.

13. The dishwasher of claim 12, wherein the fine filter is cleaned using water from the backwash nozzle in a linear operation that coincides with the lateral traversal of the washing arm.

14. The dishwasher of claim 13, wherein the water from the backwash nozzle sprays a front surface of the fine filter and passes through the fine filter, thereby dislodging particles lodged on a back surface of the fine filter.

15. The dishwasher of claim 10, wherein the fine filter and the soil accumulation chamber comprise part of a rail that is configured to guide lateral traversal of the washing arm.

16. The dishwasher of claim 10, wherein the fine filter and the soil accumulation chamber are disposed in a bottom surface of the tub.

* * * * *